(12) United States Patent
Lalonde (10) Patent No.: US 7,236,682 B2
(45) Date of Patent: Jun. 26, 2007

(54) OPTICAL RETURN LOSS MEASUREMENT (75) Inventor: André Lalonde, Allen, TX (US)

(73) Assignee: Finisar Corporation, Sunnyvale, CA (US)

( * ) Notice: Subject to any disclaimer, the term of this patent is extended or adjusted under 35 U.S.C. 154(b) by 7 days.

(21) Appl. No.: 11/214,415

(22) Filed: Aug. 29, 2005

(65) Prior Publication Data
US 2006/0072894 A1 Apr. 6, 2006

Related U.S. Application Data (60) Provisional application No. 60/615,407, filed on Oct. 1, 2004.

(51) Int. Cl.
G02B 6/00 (2006.01)
(52) U.S. Cl. ...................... 385/147; 356/73.1
(58) Field of Classification Search ................ 385/147, 385/45, 47, 16; 372/25; 356/73.1
See application file for complete search history.

(56) References Cited

U.S. PATENT DOCUMENTS 6,567,762 B2 * 5/2003 Bourde et al. .............. 702/107
6,977,720 B2 * 12/2005 Baney et al. ............... 356/73.1
2002/0181874 A1 * 12/2002 Tulchinsky et al. ........... 385/39
2005/0180747 A1 * 8/2005 Wang ............................ 398/9

OTHER PUBLICATIONS

U.S. Appl. No. 11/103,766, filed Apr. 12, 2005, Lalonde.
Analog Devices, "LF to 2.5 GHz TruPwr Detector," 2001.

* cited by examiner

Primary Examiner—Michelle Connelly-Cushwa
Assistant Examiner—Kajli Prince
(74) Attorney, Agent, or Firm—Workman Nydegger (57) ABSTRACT An optical test apparatus. The test apparatus includes an optical source. A first optical switch is connected to the optical source. An attenuated responsivity test path may be selectively coupled to the first optical switch. A return loss test path may alternatively be selectively coupled to the first optical switch. A second optical switch may be selectively coupled to the attenuated responsivity test path or the return loss test path. An optical splitter is connected to the second optical switch. The optical splitter is configured to connect to a ROSA. A detector is connected to the optical splitter. The detector is configured to connect to a test meter.

17 Claims, 5 Drawing Sheets

OPTICAL RETURN LOSS MEASUREMENT

CROSS-REFERENCE TO RELATED APPLICATIONS

This application claims the benefit of U.S. Provisional Application No. 60/615,407, titled "Optical Return Loss Measurement" filed Oct. 1, 2004, which is incorporated herein by reference.

BACKGROUND OF THE INVENTION

1. The Field of the Invention

The invention generally relates to equipment for testing fiber-optic components. More specifically, the invention relates to gauging optical return loss in fiber-optic components.

2. Description of the Related Art

Fiber-optic networking can be used to communicate in modern high-speed networks. To transmit data on a fiber-optic network, the data must be converted from an electronic signal to an optical signal. This conversion may be done for example by using a transmitting optical subassembly (TOSA). The TOSA often includes a light generating device such as a laser or light emitting diode (LED). The light generating device is modulated according to the digital data to produce a modulated optical signal.

When optical signals are received, those optical signals must generally be converted to an electronic signal. This is often accomplished using a receiver optical subassembly (ROSA). A ROSA generally includes a photo sensitive device such as a photodiode connected to a transimpedance amplifier (TIA). When an optical signal impinges the photo sensitive device, a modulated current is induced in the photo sensitive device. This current can be converted by the TIA to an electronic signal usable by digital devices on a network.

Manufacturers of ROSAs and TOSAs typically perform various performance testing on the ROSAs and TOSAs before they are delivered to distributors and end customers. This performance testing can be used to detect defects or to sort components into groups of different rated values. More particularly, testing directed towards the ROSA may include testing the responsivity of the ROSA to a modulated optical signal, testing the amount of current produced for a given amount of optical signal and so forth. The ROSA may also be tested to determine a parameter known as optical return loss. Optical return loss is a measurement of the amount of optical signal that is reflected off of the face of the ROSA when an optical signal impinges the ROSA. This reflected light may cause unwanted reflections and interference in an optical network. Further, reflected light reduces the amount of power available for converting the optical signal to an electronic signal.

Different testing conditions may be needed to test different characteristics of the ROSA. For example, when testing the ROSA for responsivity or to measure current verses optical signal received, it is often desirable to use a low power optical signal so as not to trigger the automatic gain control circuitry in the TIA. However, when testing for optical return loss it is desirable to use a higher power optical source. Optical return loss may be as low as −12 dB. Therefore, if a low-power optical signal is used to test for optical return loss, the reflected optical signal may be insufficient to perform an accurate measurement. Maintaining different testing configurations for testing a ROSA may be relatively time-consuming. For example, testing a ROSA can include installing the ROSA in various test jigs to characterize the operating characteristics of the ROSA.

BRIEF SUMMARY OF THE INVENTION

One embodiment includes a test apparatus. The test apparatus includes an optical source. A first optical switch is connected to the optical source. An attenuated responsivity test path may be selectively coupled to the first optical switch. A return loss test path may alternatively be selectively coupled to the first optical switch. A second optical switch may be selectively coupled to the attenuated responsivity test path or the return loss test path. An optical splitter is connected to the second optical switch. The optical splitter is configured to connect to a ROSA. A detector is connected to the optical splitter. The detector is configured to connect to a test meter.

Another embodiment includes a method of testing a ROSA in a single test jig assembly. The method includes transmitting an optical signal through a first optical switch to an un-attenuated path, through the un-attenuated path to a second optical switch, through the second optical switch to a splitter, and through the splitter to a ROSA. The first and second optical switches are in a first position that allows signals to travel through the un-attenuated path. The method further includes receiving reflected optical signals from the ROSA through the splitter at a detector. Signals are measured at the detector caused by the receiving reflected optical signals to generate a characterization of optical return loss.

These and other features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

One embodiment of the present invention allows for a ROSA to be tested to determine operating characteristics where the testing uses both higher power optical signals to test detected optical return loss and lower power optical signals to perform other types of ROSA characteristic testing. The embodiment includes an optical source connected to an optical switch. The optical switch can be selectively connected to either an unattenuated optical path or an attenuated optical path. A second optical switch is connected to the unattenuated optical path and the attenuated optical path. The second optical switch is connected to a splitter and subsequently to the ROSA and measurement devices.

Figure 1:
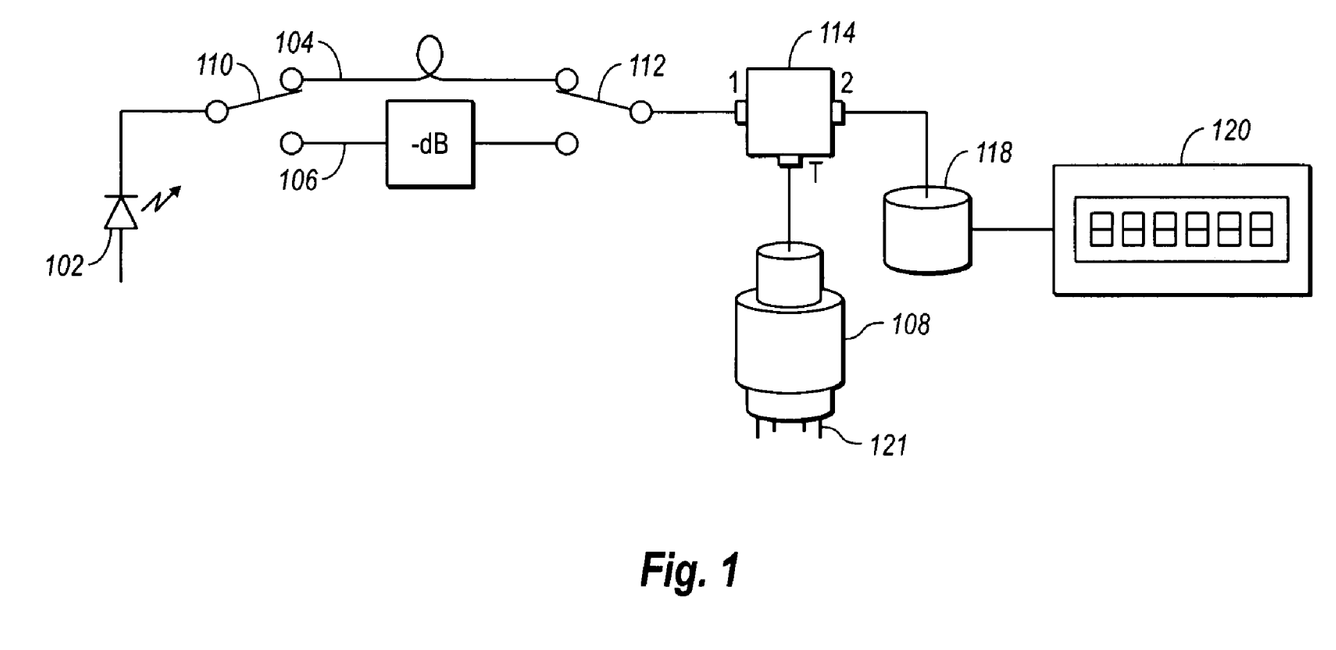
FIG. 1 illustrates a block diagram of a test apparatus for testing for optical return loss and other characteristics of a fiber-optic receiver.

Referring now to FIG. 1, an exemplary embodiment includes an optical source 102 that may be connected through alternate paths 104, 106 so as to select the appropriate optical power for testing different characteristics of a ROSA 108. The optical source 102 may be for example an 850 nanometer VCSEL laser, a 1310 nanometer laser and the like. The source 102 may be selectively connected to either an unattenuated path 104 or an attenuated path 106 through an optical switch 110. The optical signal passes through the unattenuated optical path 104 or the attenuated optical path 106 to a second optical switch 112 and further into a splitter 114. The splitter 114 causes the optical signal to be directed into a ROSA 108.

When testing is being done to determine characteristics such as the ROSA responsivity or the current verses optical signal characteristics of the ROSA 108, the first optical switch 110 and second optical switch 112 are configured such that the optical signal passes through the attenuated path 106 to the splitter 114. This allows an attenuated signal to be delivered to the ROSA 108 so as to avoid triggering automatic gain control circuitry in the ROSA 108. By not triggering the automatic gain control circuitry in the ROSA 108, the ROSA 108 characteristics can be more accurately measured and documented.

Illustratively, an optical signal is emitted from the optical source 102, attenuated by the attenuated path 106 to a level below that which would trigger the automatic gain control circuitry in the ROSA 108 and delivered to the ROSA 108. The response of the ROSA 108, a current output, to the optical signal is measured at one or more interface pins 121 of the ROSA 108. Because the optical signal is below a signal that would trigger the automatic gain control of the ROSA 108, the current output at the interface pins 121 is, in one embodiment, directly proportional to the optical signal power. In direct contrast, if the optical signal were at or above a level that triggers the automatic gain control of the ROSA 108, then the current output at the interface pins is clamped at some level irrespective of the value of the optical signal. Thus, a characterization of ROSA current to optical signal level would be difficult if not impossible to create.

When testing is being done to determine the optical return loss, the first optical switch 110 and second optical switch 112 are configured to allow an optical signal to pass through the unattenuated optical path 104 to the splitter 114. This allows a signal with a higher optical power to be transmitted to the ROSA 108. Loss signals (i.e. the signals being lost in the optical return) are then reflected from the ROSA 108 into the optical splitter 114 which causes the reflected signals to exit through port 2 of the optical splitter 114. Port 2 of the optical splitter 114 is coupled to a detector 118. The output of the detector 118 is connected to a meter 120 that is able to quantify the amount of optical signal reflected by the ROSA 108. The optical switch 110 and the optical switch 112 are integrated, in one embodiment, into a single switch with multiple contacts to allow matching of the losses. This allows the optical switch 110 and the optical switch 112 to be actuated simultaneously.

When measurements are being made to characterize the optical return loss of the ROSA 108, there is generally no concern about whether or not the automatic gain control circuitry in the ROSA 108 is activated. Namely, the output of the ROSA is not being measured, so any activation of the automatic gain control circuitry will not affect a measurement of the optical return loss.

While there is no concern about activating the automatic gain control circuitry, there is concern about providing a sufficient amount of optical energy to the ROSA 108 such that the small percentage of light that is reflected back (i.e. the optical return loss) is of a sufficient amount that it can be measured accurately. As noted previously herein, the reflected light is a small percentage of the total optical signal. If the optical signal is not strong enough, the reflected portions may not be of sufficient strength to be measured or to be accurately measured.

Figure 2:
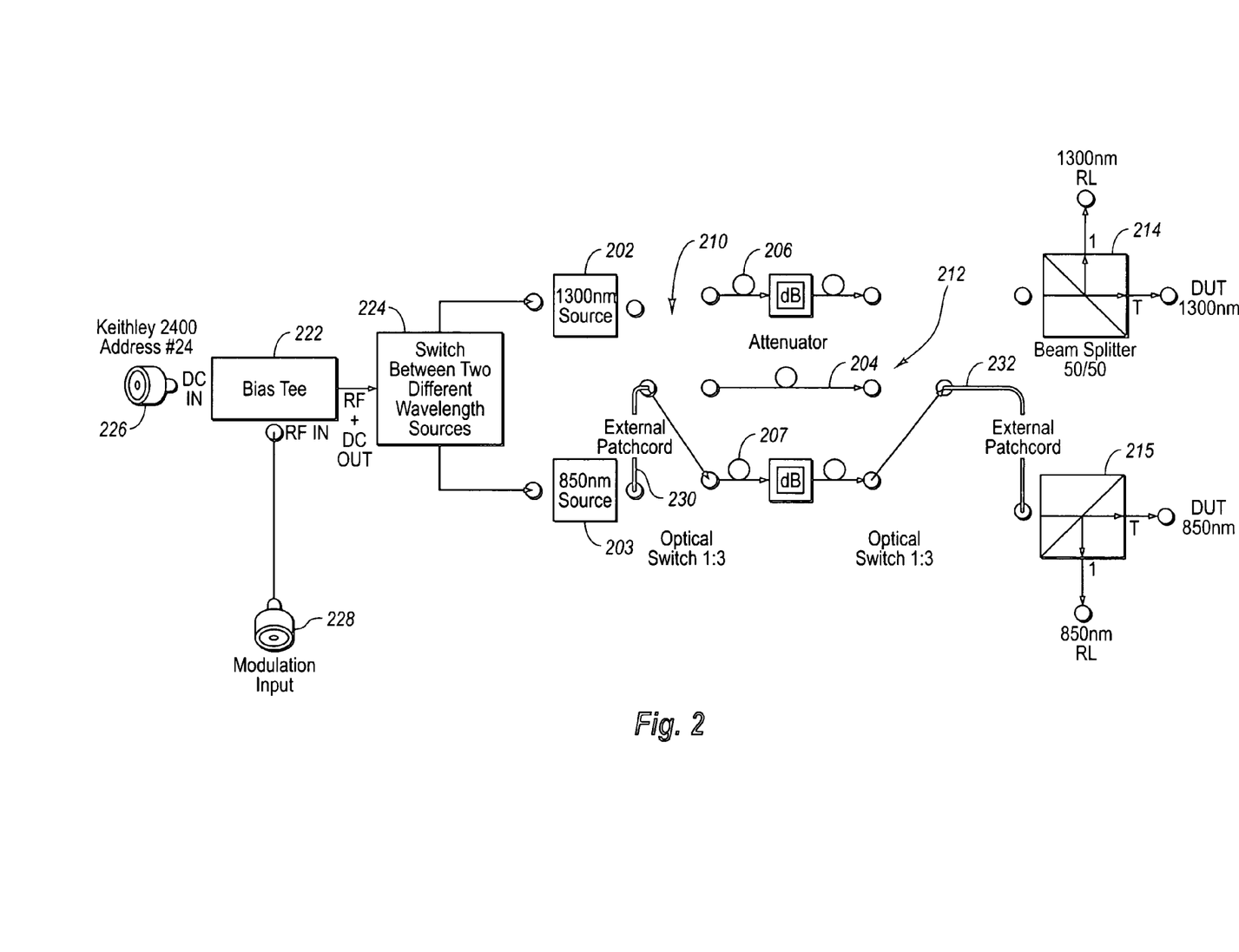
FIG. 2 illustrates a block diagram of the test apparatus configured for testing a plurality of different wavelengths of fiber-optic receivers.

With attention now directed to FIG. 2, an alternate embodiment is illustrated which includes a plurality of optical sources. This allows for a single test jig to be used for testing different ROSAs designed for different wavelengths. In the example shown in FIG. 2, a DC input 226 is input into a bias tee 222 to provide a bias voltage for the optical sources 202, 203. A modulated signal is input at a modulation input 228 to the bias tee 222. The signal input at the modulation input 228 is used to modulate the optical sources 202, 203. The bias tee 222 combines the signals input at the DC input 226 and the modulation input 228 to form a signal that includes both a bias voltage and modulation signal that may be input to the optical sources 202, 203. An output signal from the bias tee 222 that includes both a DC bias voltage and a modulated signal is fed into a switch 224 that can be used to direct the modulated and biased signal to one of the optical sources 202, 203.

In the example shown in FIG. 2, two sources are used, namely a 1300 nanometer source 202 and an 850 nanometer source 203. A source may be selectively used by connecting a patch cord 230 from the source to a three-way switch 210. The three-way switch 210 may be selectively set to direct an optical signal either through an attenuated path 206 for the 1300 nanometer source 202, 207 for the 850 nanometer source 203 or through an unattenuated path 204. A second three-way switch 212 further allows the optical signal to pass through a second patch cord 232 which may be connected to either a 1300 nanometer beam splitter 214 or an 850 nanometer beam splitter 215. As with the embodiment shown in FIG. 1, the switches 210 and 21 may be integrated into a single switch to allow for simultaneous switching and loss matching. The beam splitters 214, 215 function in a fashion similar to the beam splitter shown in FIG. 1. Similar to what is shown in FIG. 1, the beam splitters 214, 215 direct optical energy into ROSAs through port 1 while receiving reflected optical energy from the ROSAs through port 1 which optical energy is then directed to the T port where it may be used by a detector and or measurement apparatus to detect optical return loss. While in this example, patch cords are used, other embodiments may use additional optical switches. This would allow the processes described herein to be automated.

Figure 3:
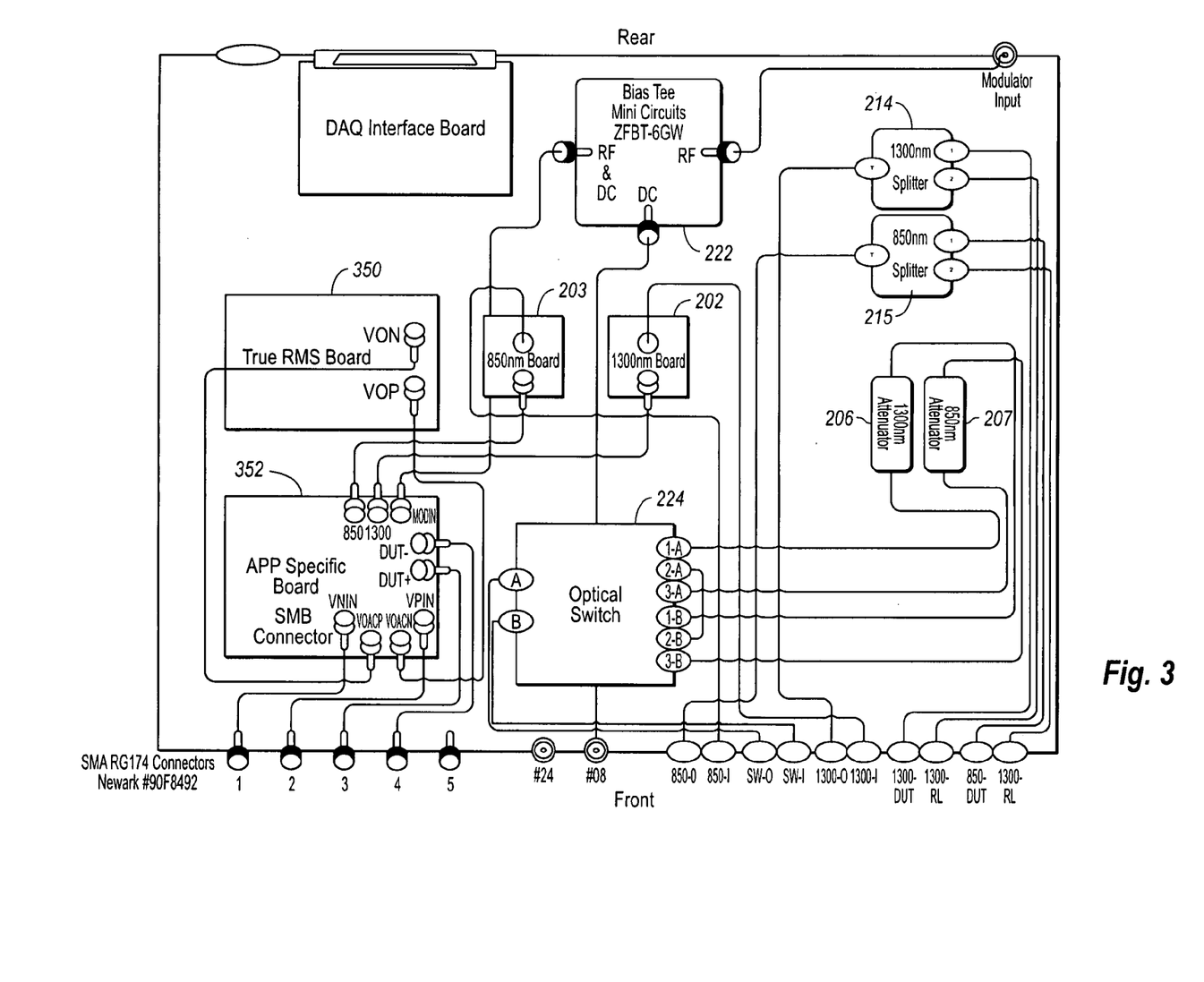
FIG. 3 illustrates a block diagram of the test apparatus shown in FIG. 2 which additionally includes other components of the test apparatus.
Figure 4:
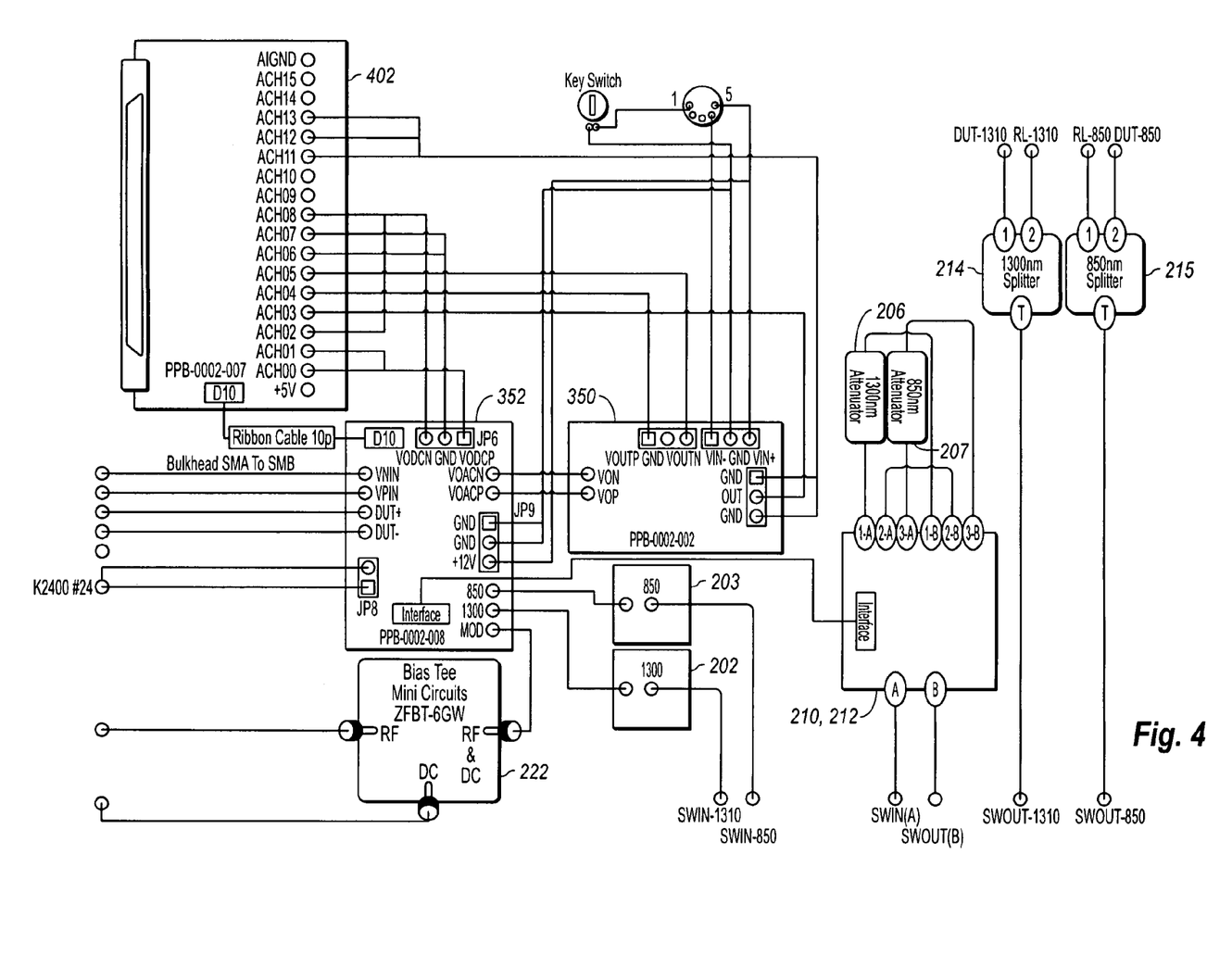
FIG. 4 illustrates a block diagram of the test apparatus shown in FIG. 2 which additionally includes other components of the test apparatus.
Figure 5:
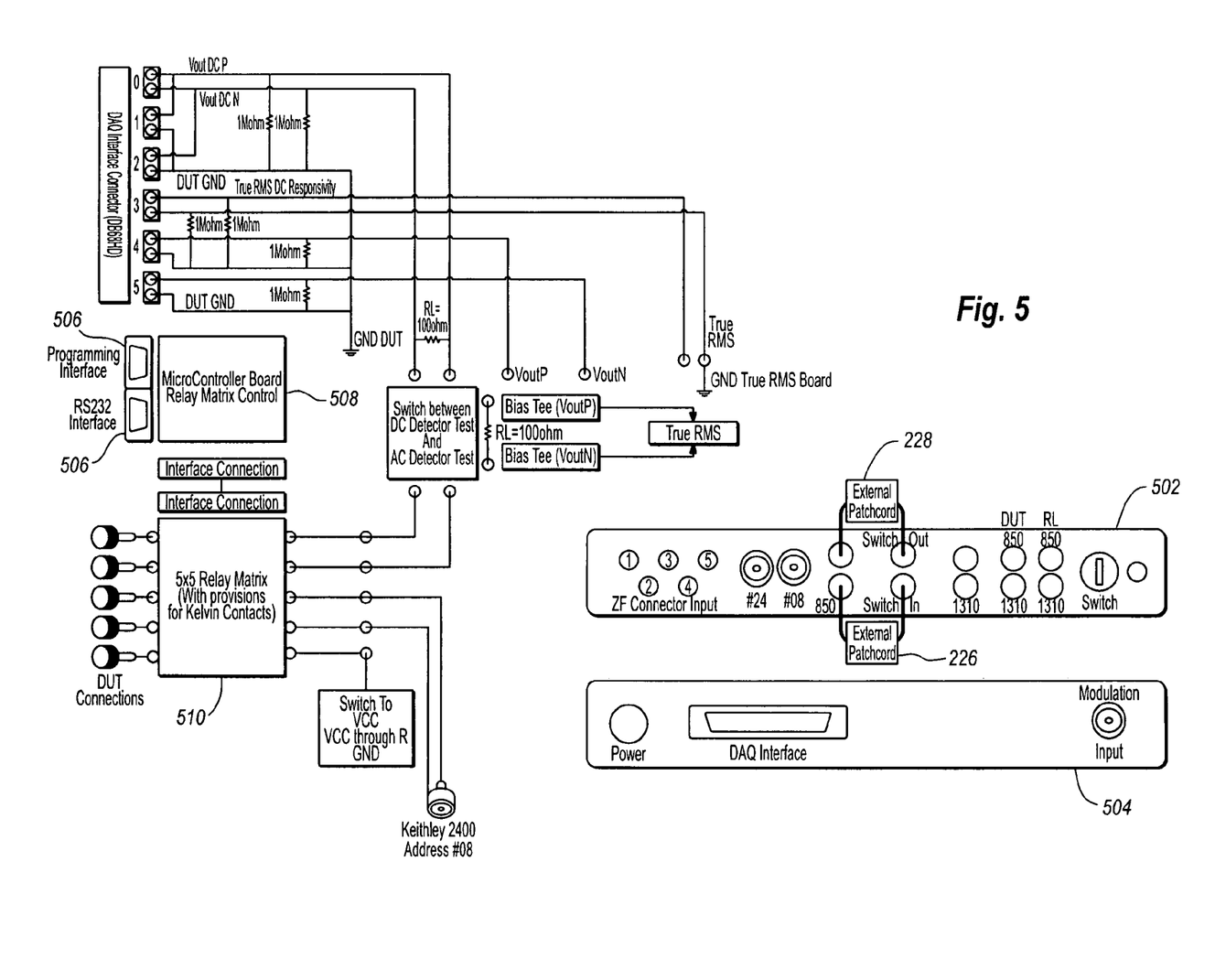
FIG. 5 illustrates a block diagram of the test apparatus shown in FIG. 2 which additionally includes other components of the test apparatus.

FIGS. 3, 4 and 5 illustrate various hardware implementations of the block diagram circuits described in FIGS. 1 and 2. For example, FIG. 3 illustrates one example where a true RMS board 350 may be used quickly to acquire a DC equivalent of the function of RMS values of various AC measurements. The true RMS board 350 may be used, for example, to measure noise or a function of an RMS equivalent of a modulated signal. A true RMS converter test apparatus is described in more detail in U.S. patent application Ser. No. 11/103,766 titled "True RMS Converter Board" filed on Apr. 12, 2005 to the present inventor, which application is incorporated herein by reference.

FIG. 3 also illustrates an App Specific Board 352, which may be used to manipulate or process data from the true RMS board 350. The App Specific Board 352 can format processed data such that it can be output to other appropriate devices. Additionally, the App Specific Board 352 may provide control signals to the 1300 nm source 202 and the 850 nm source 203. In one embodiment, these control signals may vary depending on the signals from the true RMS board 350.

FIG. 4 illustrates an embodiment of the invention including various connectors and switches used to interconnect the components described previously herein. For example, a connector board 402 provides an interface for connecting to various external circuits and data handling devices. The App specific board 352 controls the three way switches 210, 212. The true RMS board 350 is also shown in FIG. 4 and functions as previously described herein to provide appropriate output signals quantifying return loss and bias values.

Similarly, FIG. 5 illustrates various connectors and specific component values the may be used. For example, FIG. 5 illustrates a front panel 502 and a back panel 504 that may be used on a test apparatus case. FIG. 5 further illustrates various connectors 506 that may be used to connect the embodiment shown in FIG. 5 to an external computer for programming a microcontroller board 508 that controls a relay board 510 for controlling routing of various signals in the embodiment shown.

Embodiments may be referred to herein in terms of function means. For example, embodiments may refer to means for generating an optical signal. A means for generating an optical signal may include, for example, an optical source such as optical source 102 shown in FIG. 1 or the optical sources 203 and 203 shown in FIG. 3.

Embodiments may refer to means for selectively directing the optical signal into one of a plurality of optical paths wherein at least one of the paths comprises means for attenuating the optical signal and at least one of the paths is essentially un-attenuated. An example of this means is the optical switch 110 shown in FIG. 1 or the optical switch 210 shown in FIG. 2.

Embodiments may refer to a means for selectively directing the optical signal from one of the plurality of optical paths to a splitting means. The means for selectively directing may be the second optical switch 112 shown in FIG. 1 or the second optical switch 212 shown in FIG. 2. The splitting means may be for example, the optical splitter 114 shown in FIG. 1, or the optical splitters 214 and 215 shown in FIG. 2.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A test apparatus comprising:
   an optical source;
   a first optical switch coupled to the optical source;
   an attenuated responsivity test path that may be selectively coupled to the first optical switch;
   a return loss test path that may be selectively coupled to the first optical switch;
   a second optical switch that may be selectively coupled to the attenuated responsivity test path or the return loss test path;
   an optical splitter coupled to the second optical switch wherein the optical splitter is adapted to couple to a ROSA; and
   a detector coupled to the optical splitter, wherein the detector is adapted to couple to a test meter.

2. The test apparatus of claim 1, wherein the return loss test path is an essentially un-attenuated path.

3. The test apparatus of claim 1, wherein the optical source is an 850 nm laser.

4. The test apparatus of claim 1, wherein the optical source is a 1310 nm laser.

5. The test apparatus of claim 1, further comprising true RMS circuitry adapted to couple to the ROSA for creating a DC function equivalent of various AC measurements taken at the ROSA.

6. The test apparatus of claim 1, further comprising a plurality of optical sources including the optical source.

7. The test apparatus of claim 6, wherein the optical source is coupled to the first optical switch through a patch cord.

8. The test apparatus of claim 6, further comprising a plurality of attenuated responsivity test paths including the attenuated responsivity test path, where each of the plurality of attenuated responsivity test paths may be selectively coupled to the first optical switch.

9. The test apparatus of claim 6, further comprising a plurality of optical splitters including the optical splitter wherein each of the optical splitters is adapted to couple to the second optical switch.

10. The test apparatus of claim 1, further comprising a bias tee coupled to the optical source to provide DC biasing and AC signal modulation to the optical source.

11. The test apparatus of claim 1, wherein attenuated responsivity test path attenuates the optical signal to a level that will not cause automatic gain control circuitry of the ROSA to activate when an optical signal from the optical source is transmitted to the ROSA.

12. The test apparatus of claim 1, wherein the first optical switch and the second optical switch are embodied as a single switch to allow for simultaneous switching.

13. A method of testing a ROSA in a single test jig assembly, the method comprising:
   transmitting an optical signal through a first optical switch to an un-attenuated path, through the un-attenuated path to a second optical switch, through the second optical switch to a splitter, and through the splitter to a ROSA, wherein the first and second optical switches are in a first position that allows signals to travel through the un-attenuated path;
   receiving reflected optical signals from the ROSA through the splitter at a detector; and
   measuring signals at the detector caused by the receiving reflected optical signals to generate a characterization of optical return loss.

14. The method of claim 13, wherein the method further comprises:

transmitting the optical signal through the first optical switch to an attenuated path, through the attenuated path to the second optical switch, through the second optical switch to the splitter, and through the splitter to the ROSA, wherein the first and second optical switches are in a second position that allows signals to travel through the attenuated path; and measuring signals at the ROSA caused by the optical signal being transmitted to the ROSA.

15. The method of claim 14, wherein the attenuated path attenuates the optical signal to a level that will not cause automatic gain control circuitry of the ROSA to activate when the optical signal is transmitted to the ROSA.

16. The method of claim 14, wherein measuring signals at the ROSA caused by the optical signal being transmitted to the ROSA comprises converting measurements to a function of a DC equivalent of an AC signal.

17. An optical test jig comprising:

means for generating an optical signal;

means for selectively directing the optical signal into one of a plurality of optical paths wherein at least one of the paths comprises means for attenuating the optical signal and at least one of the paths is essentially unattenuated; and means for selectively directing the optical signal from one of the plurality of optical paths to a splitting means, wherein the splitting means is adapted to couple to a ROSA and to direct at least a portion of the optical signal into the ROSA.

* * * * *

UNITED STATES PATENT AND TRADEMARK OFFICE
CERTIFICATE OF CORRECTION

PATENT NO. : 7,236,682 B2
APPLICATION NO. : 11/214415
DATED : June 26, 2007
INVENTOR(S) : Lalonde It is certified that error appears in the above-identified patent and that said Letters Patent is hereby corrected as shown below:

Drawings
Sheet 2, Fig. 2, change every instance of the reference "1300" to read --1310--
Sheet 3, Fig. 3, change every instance of the reference "1300" to read --1310--
Sheet 4, Fig. 4, change every instance of the reference "1300" to read --1310--

Column 4
Line 31, change "1300" to --1310--
Line 46, change "1300" to --1310--
Line 46, change "207" to --203--
Line 50, change "1300" to --1310--
Line 52, change "210 and 21" to --210 and 212--

Column 5
Line 16, change "1300" to --1310--
Line 44, change "203 and 203" to --202 and 203--

Signed and Sealed this

Twenty-sixth Day of October, 2010

David J. Kappos
*Director of the United States Patent and Trademark Office*